United States Patent
Musashi

[19]

[11] Patent Number: 5,933,833
[45] Date of Patent: Aug. 3, 1999

[54] DATA TABLE STRUCTURE AND CALCULATION METHOD FOR MATHEMATICAL CALCULATIONS OF IRREGULAR CELLS

[75] Inventor: Kazuyuki Musashi, Kawasaki, Japan

[73] Assignee: International Business Machines Corp., Armonk, N.Y.

[21] Appl. No.: 08/724,982

[22] Filed: Oct. 3, 1996

[30] Foreign Application Priority Data

Oct. 3, 1995 [JP] Japan ................................. 7-256600

[51] Int. Cl.⁶ ...................................................... G06F 17/00
[52] U.S. Cl. ............................................ 707/102; 707/100
[58] Field of Search .............................. 345/326; 707/2, 707/100, 102, 504, 506, 510

[56] References Cited

U.S. PATENT DOCUMENTS

| | | | |
|---|---|---|---|
| 5,289,571 | 2/1994 | Harada et al. | 707/510 |
| 5,379,372 | 1/1995 | Wu | 707/506 |
| 5,425,138 | 6/1995 | Kumakawa | 707/510 |
| 5,504,854 | 4/1996 | Yamashita | 345/326 |
| 5,537,633 | 7/1996 | Suzuki et al. | 707/100 |
| 5,557,787 | 9/1996 | Shin et al. | 707/102 |
| 5,594,898 | 1/1997 | Dalal et al. | 707/2 |
| 5,621,876 | 4/1997 | Odam et al. | 707/504 |

*Primary Examiner*—Wayne Amsbury
*Assistant Examiner*—Thuy N. Pardo
*Attorney, Agent, or Firm*—A. Bruce Clay; Timothy J. O'Sullivan

[57] ABSTRACT

A table structure for table calculation software is employed to prepare an aggregate table and a numeric table by displaying ruled lines. A table structure is provided with which the degree of freedom for the designing of a table can be increased and table calculations can be easily performed. A data table structure, for a table having an irregular shape wherein a plurality of cells having different sizes are formed. Cell data areas store input data in the plurality of cells. Coordinate data areas, in addition to the cell data areas, store coordinate data for defining locations and sizes of input areas of the plurality of cells in the table.

3 Claims, 8 Drawing Sheets

PRESENT METHOD

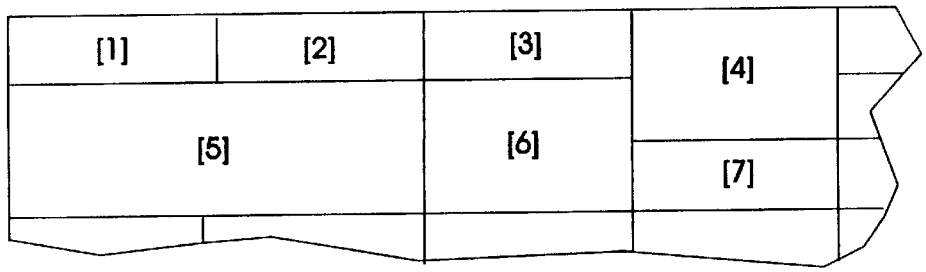
FIG. 1
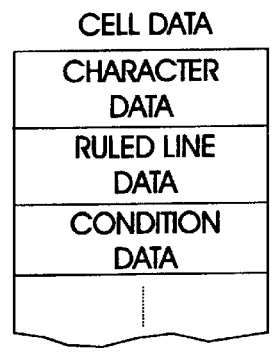
FIG. 2
FIG. 3
|   | A | B | C | D |
|---|---|---|---|---|
| 1 | COORDINATE DATA (A1) | COORDINATE DATA (B1) | COORDINATE DATA (C1) | COORDINATE DATA (D1) |
| 2 | COORDINATE DATA (A2) | COORDINATE DATA (B2) | COORDINATE DATA (C2) | COORDINATE DATA (D2) |
| 3 | COORDINATE DATA (A3) | COORDINATE DATA (B3) | COORDINATE DATA (C3) | COORDINATE DATA (D3) |

|   | A | B | C | D | E |
|---|---|---|---|---|---|
| 1 | (A1) | (B1) | (C1) | (D1) | (E1) |
| 2 | (A2) | (B2) | (C2) | (D2) | (E2) |
| 3 | (A3) | (B3) | (C3) | (D3) | (E3) |

FIG. 7

|   | A | B | C | D | E |
|---|---|---|---|---|---|
| 1 |   |   |   |   |   |
| 2 | 5 | 4 | 3 | 2 | 1 |

SUM (A2:E2) → 15

FIG. 8

|   | A | B | C | D | E |
|---|---|---|---|---|---|
|   | [1] | [2] | [3] | [4] | [5] |
|   | [6] 5 |   | [7] 3 |   | [8] 1 |

SUM (A2:E2) → 9

FIG. 9

|   | A | B | C |
|---|---|---|---|
| 1 | [1] | [2] | [3] SUB-TOTAL |
| 2 | [4] 5 | [6] 10 | [7] 15 |
| 3 | [5] 8 |  | [8] 18 |

FIG. 10A

|   | A | B | C |
|---|---|---|---|
| 1 |   |   | SUB-TOTAL |
| 2 | 5 | 10 | 15 |
| 3 | 8 |   | 18 |

FIG. 10B

|   | A | B | C |
|---|---|---|---|
| 1 |   |   | SUB-TOTAL |
| 2 | 5 | 10 | 15 |
| 3 | 8 | 10 | 18 |

FIG. 10C

PRESENT INVENTION

FIG. 11A

|   | A | B | C |
|---|---|---|---|
| 1 | [1] 100 | [2] 50 | [3] 50 |
| 2 |  | [4] 30 | [5] 50 |

=MIN (A1:B1)
=MIN(A2:B2)

⇩ COLUMN INSERTION

FIG. 11B

|   | A | B | C | D |
|---|---|---|---|---|
| 1 | [1] 100 | [6] 10 | [2] 50 | [3] 10 |
| 2 |  | [7] 15 | [4] 30 | [5] 15 |

=MIN (A1:C1)
=MIN(A2:C2)

↑ EVALUATED

CONVENTIAL METHOD

FIG. 11C

|   | A | B | C |
|---|---|---|---|
| 1 | 100 | 50 | 50 |
| 2 |  | 30 | 50 |

=MIN (A1.B1)
=MIN(A2.B2)

⇩ COLUMN INSERTION

FIG. 11D

|   | A | B | C | D |
|---|---|---|---|---|
| 1 | 100 | 10 | 50 | 50 |
| 2 |  | 15 | 30 | 30 |

=MIN (A1.C2)
=MIN(A1.C2)

↑ NOT EVALUATED

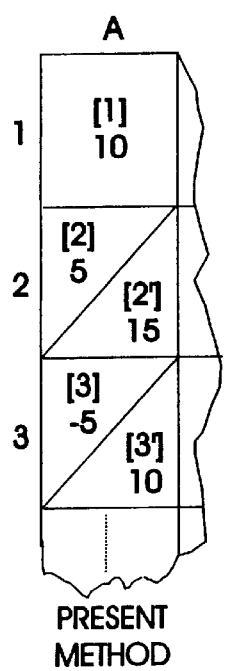
FIG. 15A PRESENT METHOD
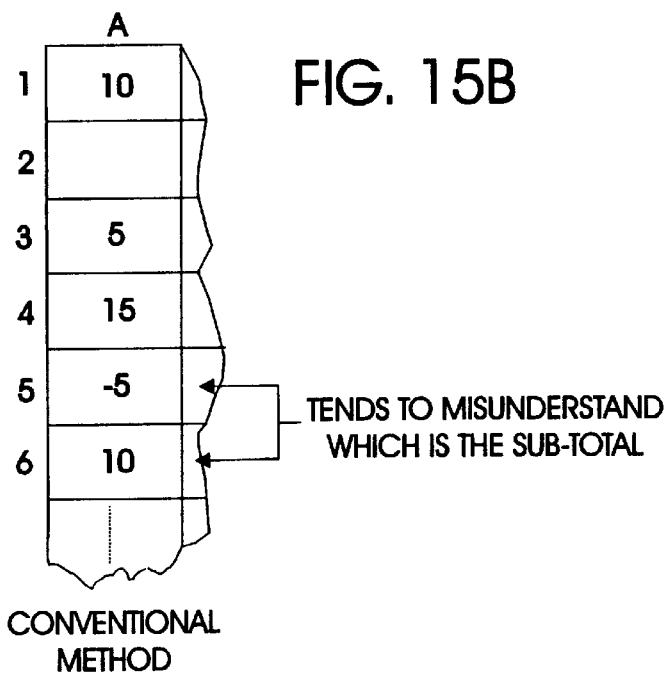
FIG. 15B CONVENTIONAL METHOD
FIG. 16A PRESENT INVENTION
FIG. 16B CONVENTIONAL METHOD

FIG. 17

|   | A | B | C | D |
|---|---|---|---|---|
| 1 | 4 | 5 | 6 | |
| 2 | 5 | 10 | 20 | |
| 3 | 6 | 15 | 4 | |
| 4 | 10 | 20 | 5 | |
| 5 | 12 | 30 | 10 | |
| 6 | | | | |

FIG. 18

| | | APRIL | | MAY | | JUNE | |
|---|---|---|---|---|---|---|---|
| BASIC CHARGES | GAS | 50 | 150 | 40 | 130 | 60 | 170 |
| | ELECTRICITY | 100 | | 90 | | 110 | |
| OTHERS | | 100 | | 90 | | 110 | |
| SUB-TOTAL | | 250 | | 220 | | 280 | |
| GRAND TOTAL | | 250 | | 220 / 470 | | 280 / 750 | |

DATA TABLE STRUCTURE AND CALCULATION METHOD FOR MATHEMATICAL CALCULATIONS OF IRREGULAR CELLS

FIELD OF THE INVENTION

The present invention relates to a table structure for table calculation software employed to prepare an aggregate table and a numeric table by displaying ruled lines, and a table calculation method.

DESCRIPTION OF THE BACKGROUND

Conventionally, various table calculations are performed with a computer by using table calculation software. The table structure employed for conventional table calculation software is a matrix structure comprising rectangular cells arranged in rows having the same number of cells and columns having the same number of cells. For example, with the row order being represented by numerals and the column order by letters, as is shown in FIG. 17, a 6×4 matrix structure having rows 1 through 6 and columns A through D is employed, with a variety of data for use in calculations, and results obtained through calculations entered in the elements in the matrix.

The individual elements of the matrix correspond to the rectangular cells, and in FIG. 17, 10, a datum item, is entered in rectangular cell B2 in the second row and the second column. When the data in the cells in the second row is added together and the sum is displayed in cell D2 in the second row and the fourth column, 35, the result, is entered in cell D2 by defining an expression, for example, SUM (A2:C2), for cell D2.

Furthermore, rows or columns can be added to or deleted from the prepared table. When, for example, one column is inserted between column A and column B, column B and the following columns are shifted in order, and when the data in the first through the fourth column are added together, the sum is displayed in the fifth column.

According to conventional table calculation software, data is stored in a matrix structure of n rows and m columns; therefore, it is premised that the cells are prepared in the same number for the rows and in the same manner for the columns, and according to the table calculation software, a table such as is shown in FIG. 18 can not be prepared for table calculation. The table in FIG. 18 and the table in FIG. 17 differ in that the table in FIG. 18 does not have the matrix structure of n rows and m columns that is used by the conventional table calculation software, but has a table structure wherein irregularly divided cells holding different numbers are provided for each row and each column. Another difference between the tables in FIGS. 17 and 18 is that in FIG. 18 a cell is divided into two areas by a diagonal ruled line and data is entered in the two separate areas.

There are many demands by users who employ table calculation software for table calculations to be performed using a table such as is shown in FIG. 18. The demand has recently increased, especially in Japan and other countries where Chinese characters are used and where tables are frequently employed in which chinese characters, etc., are displayed vertically and horizontally.

Data storage and table calculation when the table in FIG. 18 is used should be as follows; for example: charges for "gas" and "electricity" in "April" are entered in their respective cells and the sum of these entries is put into a large cell that is adjacent to the "gas" and "electricity" cells. The sum is added to fee data, which is entered in an "others" cell, and the result is entered in a "sub-total" block. Then, the "sub-totals" for the individual months are added together, with the sub-total for the current month being entered in the area above the diagonal ruled line and the "Grand Total" to date being entered in the lower area, as is shown in the lowermost blocks for "May" and "June".

Although tables such as the one in FIG. 18 are frequently used, conventional table calculation software can not cope with a table having an irregular structure (such as is shown in FIG. 18) when table calculations are performed. Currently, therefore, in order to prepare such a table and display or print it, an operator must first draw a frame with ruled lines for a table by using a word processor, perform the necessary calculations employing a manual calculator or an auxiliary calculator, such as an electronic calculator, and then enter the calculation results in predetermined locations in the prepared table.

During the process of overcoming the above shortcoming, the present inventor searched background concerning table calculation for a table such as that shown in FIG. 18 and found the following reference documents. The table structure system disclosed in Japanese Unexamined Patent Publication No. Hei 2-148170, does not adopt a table structure having a regular shape wherein each row has the same number of cells and each column has the same number of cells, but instead employs a table structure having an irregular shape wherein each row has a different number of cells and each column has a different number of cells. According to the disclosed technique, a table structure having a regular shape wherein each row has the same number of cells and each column has the same number of cells is assumed by providing imaginary lines in a table having an irregular shape, and after frame presence/absence information and frame linking information are entered, table structuring data is prepared by using the same method as for a table structure having a regular shape. In Japanese Unexamined Patent Publication No. Hei 2-148170, it is premised that a table having an irregular shape printed in advance is read by a scanner, etc., and table structuring data, for defining a table structure, is created from ruled line data that forms a table that has been read and is on hand. This technique does not employ a display device, such as that of a computer, to prepare a table and perform table calculations. Therefore, the editing of a prepared table, such as performing addition and the deletion of rows and columns, the inputting of specific data, and the table calculation method are not disclosed at all.

In Japanese Unexamined Patent Publication No. Hei 5-20340 it is disclosed that diagonal ruled lines are drawn in cells in a spread sheet. A method intended merely for displaying diagonal ruled lines is described, and there is no reference to a calculation method using a table that has diagonal ruled lines.

As is described above, although there is strong demand from users for the preparation of a table, such as the one shown in FIG. 18, that is easy to see and to understand, and for table calculation to be facilitated, current, conventional techniques do not provide satisfactory means to satisfy this demand.

It is therefore one object of the present invention to provide a table structure with which a table can be prepared that is easy to see and understand and with calculations that can be easily performed, i.e., with which the degree of freedom for the designing of a table can be increased and table calculations can be easily performed.

SUMMARY OF THE PRESENT INVENTION

To achieve the above described object, a data table structure, for a table having an irregular shape, wherein a plurality of cells having different sizes are formed, comprises: input data storage means for storing input data in the plurality of cells; and coordinate data storage means, in addition to the input data storage means, for storing coordinate data for defining locations and sizes of input areas of the plurality of cells in the table.

Further, to achieve the above object, a table structure, for calculation of a table having an irregular shape in which a plurality of cells having different sizes are formed, comprises: input data storage means for storing input data in the plurality of cells; and coordinate data storage means, in addition to the input data storage means, for storing coordinate data for defining locations and sizes of input areas of the plurality of cells in the table.

In addition, to achieve the above object, in the table structure for table calculation, the coordinate data is defined by elements of a matrix structure formed by extending all horizontal and vertical ruled lines, which define the plurality of cells.

Furthermore, to achieve the above object, the locations and the sizes of the input areas of the plurality of cells in the table are each defined by one, two or more datum items of the coordinate data.

To achieve the above object, a table calculation method, whereby data is calculated that is entered by cell number in a plurality of cells which are arranged either in a direction of rows or in a direction of columns, comprises the steps of: preparing coordinate data for defining a location and a size for each of the plurality of cells by using elements of a matrix structure, which is formed by extending all horizontal and vertical ruled lines that define the plurality of cells; storing, with the coordinate data, a cell number of a cell defined by the coordinate data; and, when a plurality of coordinate data bearing the same cell number appears during table calculation, eliminating, from calculation, all but one of the coordinate data.

BRIEF DESCRIPTION OF THE DRAWINGS

For a more complete understanding of the present invention and for further advantages thereof, reference is now made to the following Detailed Description taien in conjunction with the accompanying drawings, in which:

FIG. 1 is a diagram illustrating a table having an irregular shaped cell structure;

FIG. 2 is a diagram for explaining cell data according to a first embodiment of the present invention;

FIG. 3 is a diagram for explaining coordinate data according to the first embodiment of the present invention;

FIG. 7 is a diagram for explaining an additional cell structure and its table calculation process according to the first embodiment of the present invention;

FIG. 8 is a diagram for explaining a further cell structure and its table calculation process according to the first embodiment of the present invention;

FIG. 9 is a diagram for explaining still another cell structure and its table calculation process according to the first embodiment of the present invention;

FIGS. 10(a) through 10(c) are diagrams showing one example according to the first embodiment of the present invention and a comparison example according to a conventional technique;

FIGS. 11(a) through 11(d) are diagrams showing another example according to the second embodiment and another comparison example according to the conventional technique;

FIGS. 15(a) and 15(b) are diagrams showing another example according to the second embodiment and another comparison example according to the conventional technique;

FIGS. 16(a) and 16(b) are diagrams showing a modification according to the present invention and one comparison example according to a conventional technique;

FIG. 17 is a diagram for explaining a conventional cell structure and its table calculation; and FIG. 18 is a diagram illustrating an ideal table.

DESCRIPTION OF THE PREFERRED EMBODIMENTS

The preferred embodiments of a table structure for table calculation and a table calculation method for carrying out the present invention will now be described while referring to FIGS. 1 through 9.

Suppose that a table with the irregular table structure shown in FIG. 1 is prepared. The table in FIG. 1 comprises seven cells of different sizes, with the cells being numbered [1] through [7].

Basically, one datum item or one calculation expression is entered as character data in a cell data area for each of the different sized cells numbered [1] through [7]. The cell data areas serve as input data storage means in which are stored, as is shown in FIG. 2, not only character data but also ruled line data, which describe the types of ruled lines with which the cells are to be formed, and condition data, which describe the colors for the cells. Since the cell data is not related to the present invention, an explanation for them will not be given.

When data or a calculation expression is to be input to a predetermined cell in a table displayed on a display device, coordinate data for defining the areas of the individual cells must be employed to identify in which cell input data is stored as character data. According to the present invention, coordinate data, as is shown in FIG. 3, is employed for the table in FIG. 1. All of the horizontal and vertical ruled lines that form the cells [1] through [7] in FIG. 1 are extended to provide a matrix structure of three rows, 1 through 3, and four columns, A through D, and the individual matrix elements are regarded as the coordinate data. As is shown in FIG. 3, coordinate data for the cell in the first column in the first row is represented by (A1).

Figure 4:
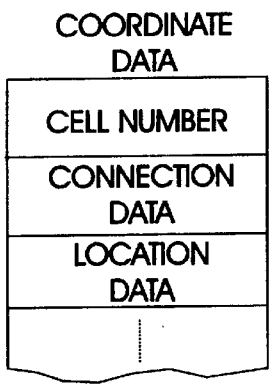
FIG. 4 is a diagram for explaining the coordinate data according to the first embodiment of the present invention.
Figure 5:
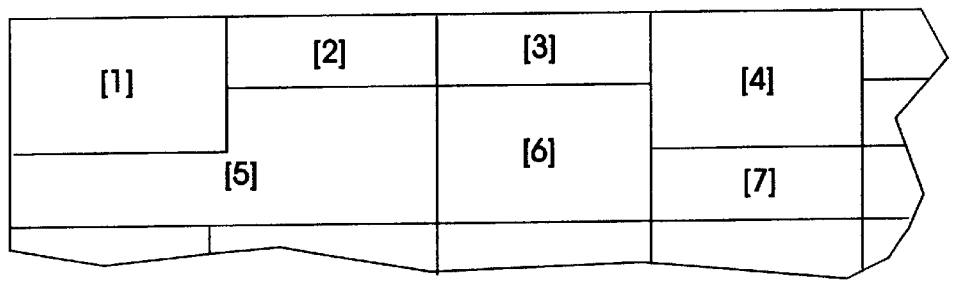
FIG. 5 is a diagram for explaining a cell structure and its table calculation process according to the first embodiment of the present invention.
Figure 6:
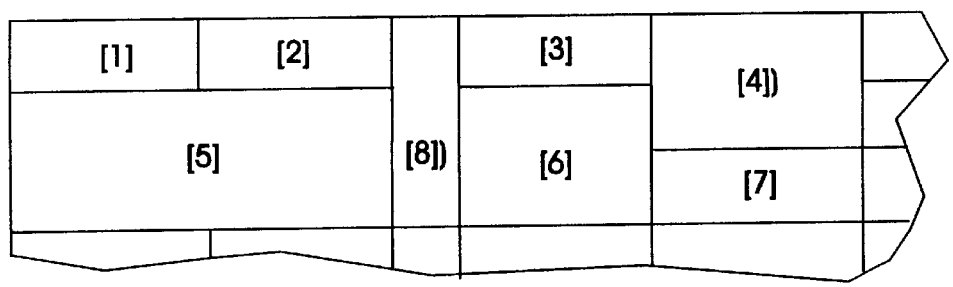
FIG. 6 is a diagram for explaining another cell structure and its table calculation process according to the first embodiment of the present invention.

The cell number of each cell defined by the coordinate data is entered in coordinate data storage means, as is shown in FIG. 4. Also stored therein is connection data that describes how the coordinate data is connected with other coordinate data when a plurality of coordinate data are employed to define a single cell, and location data that describes locations in the display area of the display screen.

For example, the data for cell number [1] is stored in coordinate data area (A1), and since the cell with the cell number [1] is not defined by other coordinate data, a connection data area for coordinate data (A1) is blank.

The cell with the cell number [5] is entered in common in coordinate data areas (A2), (A3), (B2) and (B3); and in connection data areas for these, the numbers of other linking coordinate data are entered.

The relationship between the coordinate data and the cell data has the multiple-to-one correspondence that follows:

| Coordinate Data | | Cell Data |
|---|---|---|
| (A1) | → | [1] |
| (B1) | → | [2] |
| (C1) | → | [3] |
| (D1), (D2) | → | [4] |
| (A2), (B2), (A3), (B3) | → | [5] |
| (C2), (C3) | → | [6] |
| (D3) | → | [7] |

When, for example, data is entered in the cell data area for cell number [1] in the table on a display device, the entry in the cell with the cell number [1] is identified by using the location data for the coordinate data (A1) that defines the cell with the cell number [1], and the input data is stored as character data in the cell data area with the cell number [1].

When, for example, data is entered in the area of the cell with the cell number [5], the entry of the data in the cell with the cell number [5] is identified by using location data for any of the coordinate data (A2), (A3), (B2) or (B3), which together describe the cell with the cell number [5], and the input data is stored as character data in the cell data area with the cell number [5].

As is described above, the feature of the present invention is that, in addition to cell data for each cell, coordinate data is prepared for defining the location and the size of the input area for each cell in a table having an irregular shape and wherein are formed a plurality of differently sized cells.

If, in the table in FIG. 1, the cell with the cell number [1] is extended in the direction of the columns to a location where the coordinate data (A2) is covered while its width in the direction of the rows is maintained (see FIG. 5), the relationship between the coordinate data and the cell data is as follows.

| Coordinate Data | | Cell Data |
|---|---|---|
| (A1), (A2) | → | [1] |
| (B1) | → | [2] |
| (C1) | → | [3] |
| (D1), (D2) | → | [4] |
| (B2), (A3), (B3) | → | [5] |
| (C2), (C3) | → | [6] |
| (D3) | → | [7] |

This indicates that only the location and size of a predetermined cell is altered while the contents of the other cell data areas is not changed.

In addition, when one column is inserted between cells with the cell number [2] and [5] and the cells with the cell number [3] and [6], and when the cell number of the inserted column is [8], (C1), (C2) and (C3) are employed as coordinate data for cell number [8], as is shown in FIG. 7, and the numbers for the following columns of coordinate data are shifted.

The relationship between the coordinate data and the cell data is as follows:

| Coordinate Data | | Cell Data |
|---|---|---|
| (A1) | → | [1] |
| (B1) | → | [2] |
| (C1), (C2), (C3) | → | [8] |
| (D1) | → | [3] |
| (E1), (E2) | → | [4] |
| (A2), (B2), (A3), (B3) | → | [5] |
| (D2), (D3) | → | [6] |
| (E3) | → | [7] |

This indicates that no changes are effected in the cell data except in the data for the inserted cell (the cell with the cell number [8]), and only the location and the size of the inserted cell and the locations of the cells that were shifted due to the insertion of the cell are changed.

As is described above, according to the present invention, since coordinate data for defining the location and the input area size of each cell in a table is prepared in addition to the cell data for each cell, it is easy, even for an irregularly shaped table with a plurality of differently sized cells, to enter data in each cell, and to vary the sizes of the cells or to add or to insert a new cell. In addition, though such processes are performed, the character data for each cell is not affected.

A table calculation method using a table structure according to the present invention will now be explained while referring to FIGS. 8 and 9. The table calculation method is different from the conventional method employed to cope with the above described table that has the structure of the present invention. Since one or more sets of coordinate data define the location and the size of a cell, a plurality of coordinate data share the same cell data. Therefore, if the conventional calculation method is used, the character data may be repeatedly calculated for the same cell data.

An irregular table structure like the table structure of the present invention, as well as the conventional table calculation software, requires a special process to employ a calculation expression, such as SUM (A2:E2), for calculating the sub-total in the second row, for example. When the same table structure as the conventional one in FIG. 8, i.e., the regular table structure, is prepared based on the present invention, the sub-total in the second row can be acquired in the same manner as it is using the conventional method, i.e., SUM (A2:E2)=A2+B2+C2+D2+E2.

When values 5, 3 and 1 are entered in three cells in the second row in the table shown in FIG. 9, however, since the same cell number, [7], that is stored in coordinate data areas (B2), (C2) and (D2), three of the corresponding character data are overlapped.

In the first embodiment of the present invention, when the same cell number appears in a plurality of coordinate data areas in a row or in a column, the coordinate data is eliminated from calculations, such as for acquiring the subtotal of the row or the column where a plurality of coordinate data areas hold the same cell number, so that an expression, SUM (A2:E2), can be employed with which a user is conventionally familiar.

According to the first embodiment of the present invention, specific examples of the present invention and comparison examples using the conventional technique will now be described.

EXAMPLE 1

FIG. 10(A) is a diagram showing an example table that has irregularly divided cells. Expression "SUM (A2:B2)" is stored as character data in the cell data area with the cell number [7], and "15" (A2+B2=5+10=15) is displayed as the result of table calculation. Expression SUM (A3:B3) is stored as character data in the cell data area with the cell number [8], and 18 (A3+B3=8+10=18) is displayed as the result of table calculation. In this manner, character data is provided as cell data in the cells that are actually displayed, and is provided separately from the cell data, with table calculation being performed by using only coordinate data, so that calculation for a table having an irregular table structure can be easily performed.

Comparison Example 1

According to table calculation performed using conventional table calculation software, as is shown in FIG. 10(B), when value 10 is entered only in cell B2, the subtotal of cell C3 in the direction of the rows must be acquired by manual calculation, or by performing a complicated calculation, such as SUM (A3, B2). When, as is shown in FIG. 10(C), the same value, 10, is entered in cells B2 and B3, even though the sub-total in the direction of the rows can be calculated, the calculation of the sub-total in column B is complicated by the need to avoid repeated calculations using the same value. Further, since a meaningless value is displayed in cell B3 in the prepared table, the utility value of the table is reduced.

EXAMPLE 2

FIGS. 11(A) and 11(B) are diagrams illustrating a second example according to the present invention. In FIG. 11(A), in the cell data with the cell number [3] is stored, as character data, expression "Min (A1:B1)", which is the minimum value of the values that are input to the cells with the cell number [1] and [2]. In the cell data with the cell number [5] is stored, as character data, expression "Min (A2:B2)", which is the minimum value of the values that are input to the cells with the cell number [1] and [4].

As is described in the first embodiment, these calculations can be performed with the present invention. Even when, as is shown in FIG. 11(B), Values 10 and 15 are input to the cells with the cell number [6] and [7], which are created by adding a column between columns A and B, character data in the cells with the cell number [3] and [5], which were shifted to the right in response to the insertion of a column, are changed to "Min (A1:C1)" and "Min (A2:C2)" in the same manner as the conventional method. As a result, correct calculation results 10 and 15 can be displayed in the cells with the cell number [3] and cell number [5].

Comparison Example 2

According to table calculation performed by using the conventional table calculation software, as is shown in FIG. 11(C), the limited expression "Min (A1, B2)", with which only a comparison of A1 with B2 is performed, has to be defined in cell C2. After a column is inserted, therefore, the expression must be re-defined to obtain correct results.

Figure 12:
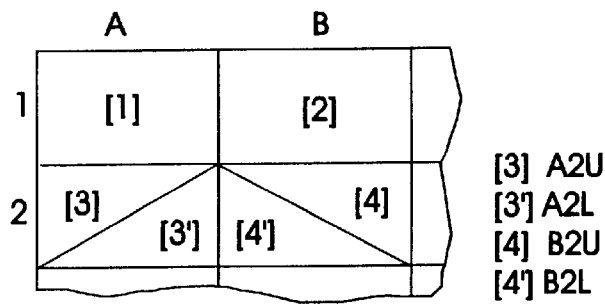
FIG. 12 is a diagram for explaining one cell structure and its table calculation process according to a second embodiment of the present invention.

A second embodiment of the present invention will now be explained while referring to FIGS. 12 and 13. In this embodiment, a diagonal ruled line is drawn in a cell, and the upper portion and the lower portion of the cell are employed as independent cells. As is shown in FIG. 12, the inclinations of diagonal ruled lines are arbitrary. Suppose that in FIG. 12, cells in which diagonal ruled lines are not yet drawn are cells [1], [2], [3] and [4]. When the diagonal ruled line is then drawn in cell [3], the obtained cell portion above the diagonal ruled line is regarded as cell [3] and the lower cell portion is regarded as cell [3']. Similarly, when the diagonal ruled line is drawn in the cell [4], the obtained cell portion above the diagonal ruled line is regarded as cell [4] and the lower cell portion is regarded as cell [4'].

The relationship between coordinate data and cell data is as follows.

| Coordinate Data | Cell Data | Upper and Lower Cell Data |
|---|---|---|
| (A1) | → [1] | |
| (B1) | → [2] | |
| (A2U) | → [3] | → [3] |
| (A2L) | | → [3'] |
| (B2U) | → [4] | → [4] |
| (B2L) | | → [4'] |

Figure 13:
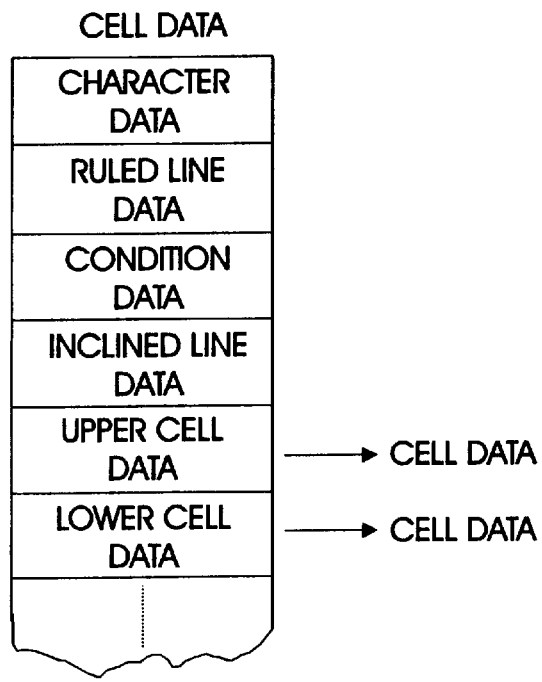
FIG. 13 is a diagram for explaining another cell structure and its table calculation process according to the second embodiment of the present invention.

As the cell data, in addition to those items in FIG. 2, diagonal ruled line data that describe the provision of diagonal ruled lines, and upper and lower cell data concerning the areas above and below the diagonal ruled lines are provided, as is shown in FIG. 13. The upper cell data and the lower cell data that are newly prepared include the contents shown in FIG. 2.

With this structure, cell data that is independent of coordinate data can be stored in consonance with their cell numbers in cells divided by diagonal ruled lines. The table structure for table calculation and the table calculation method can be provided as are explained in the first embodiment.

According to the second embodiment of the present invention, specific examples of the present invention and comparison examples for which the conventional technique was used will be explained.

EXAMPLE 3

Figure 14A:
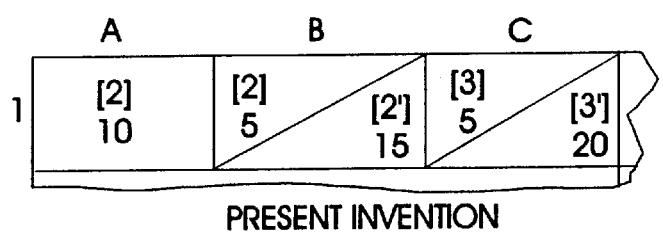
FIGS. 14(a) and 14(b) are diagrams showing one example according to the second embodiment and one comparison example according to a conventional technique.

FIG. 14(A) shows a table in which diagonal ruled lines are drawn across cells that are arranged in the direction of the row. In the lower cell with the cell number [2'] is displayed value 15, which is obtained by adding value 10 in cell [1] to value 5 in the upper cell [2]. In the lower cell with the cell number [3'] is displayed value 20, which is obtained by adding value 15 in the lower cell [2'] to value 5 in the upper cell [3].

The expression stored in the lower cell data with the cell number [2'] is "SUM (A1, B1U)", and the expression stored in the lower cell data with the cell number [3'] is "SUM (B1L, C1U)".

Comparison Example 3

Figure 14B:
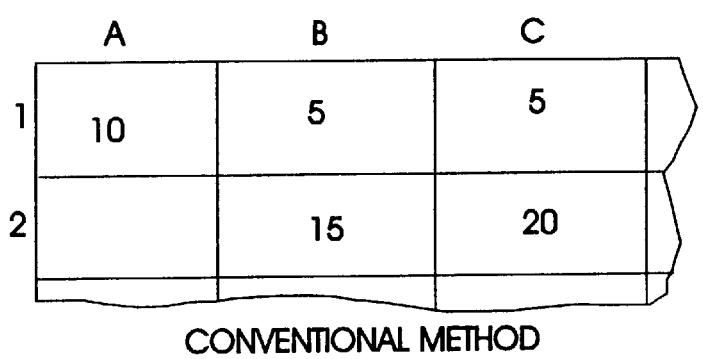

It is impossible for conventional table calculation software to draw diagonal lines in a cell. As is shown in FIG. 14(B), therefore, the cells for two rows are prepared as substitute means by which to perform table calculation, so that it is difficult for that data to be visually and intuitively understood from the table wherein the calculation results are shown.

EXAMPLE 4

FIG. 15(B) shows a table in which ruled lines are drawn diagonally in cells arranged in a column. In the lower cell with the cell number [2'] is displayed value 15, which is obtained by adding value 10 in cell [1] to value 5 in the upper cell [2], which is defined by the diagonal ruled line. In the lower cell with the cell number [3'] is displayed value 10, which is obtained by adding value 15 in the lower cell [2'] to value −5 in the upper cell [3].

The expression that is stored in the lower cell with the cell number [2'] is "SUM (A1, A1U)", and the expression that is stored in the lower cell with the cell number [3'] is "SUM (A2L, A3U)".

Comparison Example 4

In this example, as well as in comparison example 3, it is impossible for conventional table calculation software to draw diagonal lines in a cell. Even if, as is shown in FIG. 15(B), table calculation is performed with cells A3 and A4, and A5 and A6 as sets, it is difficult for that data to be visually and intuitively understood from the resulting table.

As is apparent from the above explanation, according to the present invention, the table shown in FIG. 18 can be easily prepared and table calculations can thus be performed easily.

According to the present invention, since a plurality of coordinate data can define a single cell and character data can be stored independently as cell data in the cell, the characters for "Basic Charges" can be displayed vertically in cells that are described by the coordinate data (A1) and (A2), as is shown by the cell in FIG. 16(A). According to the conventional method, a new cell must be formed for only one character, as is shown in FIG. 16(B), and as a result, an additional row must be inserted between the existing ones.

The methods and the forms used for storing coordinate data, cell data and upper and lower cell data are not limited to those in the first and second embodiment, and various modifications may be applied. In the above embodiments, when a ruled line is drawn diagonally in a cell, stored data for cell data and upper cell data are overlapped for the sake of convenience. However, for simplification, the upper cell data can be included in the cell data.

Although the methods used for table structure and table calculation have been explained together in the above embodiments, the present invention can be applied for the preparation of a table for which no "calculation" is included, and for the input of data.

Although the present invention has been described with respect to a specific preferred embodiment thereof, various changes and modifications may be suggested to one skilled in the art, and it is intended that the present invention encompass such changes and modifications as fall within the scope of the appended claims.

I claim:

1. A table calculation method, in which result data is mathematically calculated for a plurality of cells which are arranged either in a direction of rows or in a direction of columns, comprising the steps of:

defining a location and size for each of said plurality of cells by using elements of a matrix structure which is formed by extending all horizontal and vertical ruled lines that define said plurality of cells, wherein elements of the matrix structure have associated calculation data and wherein the location and size for at least one cell of the plurality of cells is defined by a plurality of elements of the matrix structure; and calculating the result data from the plurality of cells, wherein mathematical calculations including the at least one cell utilize calculation data associated with only one of the plurality of elements of the matrix which define the at least one cell.

2. A method according to claim 1, wherein the at least one cell is defined by elements of the matrix from more than one row of the matrix and wherein the step of calculating the result data comprises calculating the result data for each row using the only one of the plurality of elements.

3. A method according to claim 1, wherein the at least one cell is defined by elements of the matrix from more than one row of the matrix and more than one column of the matrix, and wherein the step of calculating the result data comprises calculating the result using the only one of the plurality of elements.

* * * * *